US012691670B2

(12) United States Patent  
Schmidt et al.

(10) Patent No.: US 12,691,670 B2  
(45) Date of Patent: Jul. 28, 2026

(54) METHOD FOR MANUFACTURING A TRIM ELEMENT

(71) Applicant: JOYSONQUIN Automotive Systems GmbH, Rutesheim (DE)

(72) Inventors: Martin Schmidt, Gerabronn (DE); Claudia Wengert, Pforzheim (DE)

(73) Assignee: JOYSONQUIN Automotive Systems Gmbh, Rutesheim (DE)

( * ) Notice: Subject to any disclaimer, the term of this patent is extended or adjusted under 35 U.S.C. 154(b) by 213 days.

(21) Appl. No.: 18/203,335

(22) Filed: May 30, 2023

(65) Prior Publication Data

US 2023/0302781 A1 Sep. 28, 2023

Related U.S. Application Data

(62) Division of application No. 16/909,725, filed on Jun. 23, 2020, now abandoned.

(30) Foreign Application Priority Data

Jun. 28, 2019 (DE) .......................... 102019209501.1

(51) Int. Cl.  
B32B 37/18 (2006.01)  
B32B 37/06 (2006.01)  
B32B 37/10 (2006.01)

(52) U.S. Cl.  
CPC ............ B32B 37/182 (2013.01); B32B 37/06 (2013.01); B32B 37/10 (2013.01); B32B 2309/02 (2013.01);  
(Continued)

(58) Field of Classification Search  
CPC ... B32B 37/02; B32B 2605/003; B32B 37/06; B32B 37/182  
See application file for complete search history.

(56) References Cited

U.S. PATENT DOCUMENTS 2,321,740 A * 6/1943 Flint ....................... B44C 3/082  
428/326  
5,938,881 A 8/1999 Kawata et al. ............ 156/307.4  
(Continued)

FOREIGN PATENT DOCUMENTS

DE 4124297 1/1993  
DE 10014046 9/2001  
(Continued)

OTHER PUBLICATIONS

Third party observation dated Oct. 19, 2021 in corresponding EP application 20200181492; 7 pages; with partial English translation, 5 pages.

(Continued)

*Primary Examiner* — Philip C Tucker  
*Assistant Examiner* — John Blades  
(74) *Attorney, Agent, or Firm* — Fattibene and Fattibene, LLC; Paul A. Fattibene

(57) ABSTRACT

A cost-effective and resource-saving method for manufacturing a trim element, in particular a trim element which is used as a vehicle interior lining element. The trim element has a rear side reinforcement layer and a decorative surface. In the method according to the invention, a first layer is bonded in a first lamination step under pressure and heat to a first lamination and a second layer is bonded in a second lamination step under pressure and heat to a second lamination. The heat introduced in the second lamination step also acts in the first lamination and increases its bonding strength to the first layer.

12 Claims, 2 Drawing Sheets

(52) U.S. Cl.
    CPC ... *B32B 2309/125* (2013.01); *B32B 2605/003*
    (2013.01)

(56)                    References Cited

U.S. PATENT DOCUMENTS

| | | | | |
|---|---|---|---|---|
| 2005/0266234 | A1 | 12/2005 | Muller et al. | 428/333 |
| 2008/0149262 | A1 | 6/2008 | Hattori | 156/60 |
| 2011/0220271 | A1 | 9/2011 | Fyie | 156/60 |
| 2016/0046105 | A1 | 2/2016 | Markowski | 156/60 |

FOREIGN PATENT DOCUMENTS

| | | |
|---|---|---|
| DE | 20023843 U1 | 12/2006 |
| DE | 102008009766 | 8/2009 |
| DE | 102012016147 | 3/2014 |
| DE | 102016107789 | 11/2017 |
| DE | 202019101689 | 6/2019 |

OTHER PUBLICATIONS

German Notification dated Aug. 19, 2021 in corresponding German application 10 2019 209 501.1; 7 pages; with English translation, 6 pages.
EPO Search Report dated Oct. 16, 2020 in corresponding European application EP 20 18 1492; 2 pages.
U.S. Appl. No. 16/909,725, filed Jun. 23, 2020, Schmidt et al.

* cited by examiner

METHOD FOR MANUFACTURING A TRIM ELEMENT

RELATED APPLICATIONS

This application is a divisional of U.S. application Ser. No. 16/909,725 filed Jun. 23, 2020, which claims foreign priority benefits on German Application no. 10 2019 209 501.1 filed Jun. 28, 2019, all of which are herein incorporated by reference.

FIELD OF THE INVENTION

The present invention relates to a method for manufacturing a trim element, in particular a trim element which is used as a vehicle interior lining element. Such interior lining elements can be lining elements for the center console or the doors or trim elements in the dashboard of the vehicle.

BACKGROUND OF THE INVENTION

Trim elements for automotive interior are nowadays produced, in particular, in that a decorative layer which completely or partially forms the face side surface of the trim element is back injection molded with a reinforcement layer and provided on the face side with a transparent coating. Such a method is known from DE 41 24 297 A1. With regard to good mechanical coupling of the rear side injection mold to the decorative layer, it is also known to provide this decorative layer with a lamination. The lamination is typically applied to the decorative layer before the decorative layer is injection mold coated.

A method for producing a trim element is known from DE 10 2008 009 766 A1, in which an upper and a lower nonwoven lamination are laminated onto a material layer. In a first joining step, a precious wood veneer is bonded on the upper side of the material layer to the lamination. This creates a multilayer structure consisting of the wood veneer, the upper lamination layer and the material layer. The material forming the upper lamination layer has a lower activation temperature than the lamination material on the underside. When the multi-layer structure is created, only the lamination provided on the upper side is then activated, but not the lamination disposed on the underside. However, the conditions are set such that even the lamination provided on the upper side does not fully cure. The multi-layer structure is then placed in an injection mold and back injection molded to form a reinforcement layer. The temperatures and pressures acting there are there considerably higher than the conditions for activating the lamination provided on the upper side. The lamination on the underside is then fully activated and the upper lamination layer provided on the oppositely disposed side has fully set, which allows the precious wood veneer to glide and thereby perform a slight relative motion relative to the material layer before and during the injection molding due to the incomplete setting and thus prevent damage to the precious wood veneer during the back injection molding.

Various laminations which can also be used for the application of the present invention are known. The lamination can be formed by combining a nonwoven material with adhesive. The lamination can be, for example, nonwoven fabric having adhesive applied on both sides. Such laminations are typically applied to the decorative layer by flatbed lamination. The lamination is there applied on a flat table. The decorative layer is placed onto the lamination. The lamination and the layer are bonded to each other subject to the application of pressure and temperature by a die driven against the table. The film of adhesive can be formed on the basis of phenol, melamine, acrylic, polyurethane or their combinations. Such laminations are known and common, in particular, in the furniture industry. The film of adhesive is crosslinked by applying pressure and temperature. It bonds accordingly with the layer.

An alternative lamination is formed by a mono-ply or multi-ply plastic film. Such a plastic film is usually calendered on. A multi-ply film is typically employed when, firstly, the lamination is to be adapted for the best possible adhesion to the layer and for the best possible adhesion to a layer placed thereagainst, for example, the rear side reinforcement layer. In this case, one ply has particularly good adhesion properties to the first layer and the other ply particularly good adhesion properties to the second layer. Here as well, the lamination takes place by applying pressure and heat. The heat causes the plastic material of the film to at least flow, the film is possibly melted, whereby the adhesion with the layer(s) is improved.

For reasons of design, there is sometimes a need to arrange different layers as separate plies one after the other. For example, it is known from DE 10 2012 016 147 A1 to first bond a first layer provided with through-holes to a second layer. The intermediate product thus formed is placed in an injection mold to inject a reinforcement layer onto the rear side of the second layer.

SUMMARY OF THE INVENTION

The present invention is based on the problem of specifying a cost-effective and resource-saving method for manufacturing a trim element with multiple layers.

A method having the features of an embodiment is proposed for this according to the invention. In this method, the first layer is bonded subject to the application of pressure and heat to a first lamination in a first lamination step. A second layer is bonded under pressure and heat to a second lamination in a second, subsequent lamination step. The heat introduced in the second lamination step also acts in the first lamination. The effect of the heat introduced in the second lamination step into the first lamination is such that improved adhesive bonding between the first lamination and the first layer is obtained.

The first lamination step for bonding the first lamination to the first layer is typically carried out in such a way that the composite thus produced is still incomplete. Energy in the form of pressure or temperature is introduced only insufficiently during the first lamination step, whereby resources can be saved in this first lamination step. In the case of a crosslinking bonding agent which is part of the first lamination, this bonding agent is only slightly crosslinked or partially crosslinked in the first lamination step. The maximum degree of crosslinking for an activatable lamination after the first lamination step is usually less than 50 percent.

In the second lamination step, the composite force between the first layer and the first lamination is increased.

In the case of a crosslinking bonding agent being part of the first lamination, further possibly complete crosslinking is obtained also in the first lamination due to the heat introduced in the second lamination step. In any case, the adhesion of the first lamination to the first layer after the second lamination step has a better quality than after the first lamination step. The same applies to a bonding agent formed as thermoplastic material which is bonded to the first layer. Due to the heat introduced, the second lamination step causes adhesion with improved quality over the adhesion obtained after the first lamination step here as well.

The method according to the invention can be carried out favorably in terms of energy efficiency. It is not necessary that the adhesion of the lamination to the associated layer is already completed in the respective lamination step. A temporally preceding lamination step can initially instead be used only to adhere or bond the lamination associated with the layer to the latter. A complete composite that meets practical requirements does not have to take place already in the temporally preceding lamination step. The process energy introduced in the subsequent lamination step(s) is instead used to improve the adhesion between a layer and a lamination which were initially bonded in a temporally preceding lamination step. The process energy is there not confined to heat input. The pressing pressure applied for a subsequent lamination step in conjunction with a pressing time can instead be used synergistically in the same way.

According to the invention, substantially planar, multi-ply intermediate products are respectively produced in the first and second lamination steps. The lamination is there typically carried out in a flatbed lamination system. After the first lamination step, a substantially planar ply composite has been produced. The first layer of the ply composite is typically visible on the face side of the trim element and can be formed by a veneer. In the second lamination step, this ply composite is bonded at its rear side facing away from the face side to the second layer. The first lamination provided between the first layer and the second layer is typically used to bond the first and the second layer to one another. The result in a substantially planar intermediate product, referred to as a sandwich structure, which is provided with the second lamination on its rear side. In the second lamination step, this second lamination is bonded to the second layer.

A lamination in the sense of the present invention is thereby a single or multi-layer adhesion-promoting-sheet, which in the lamination step bonds at least on one side to the associated layer. In the second lamination step, the first lamination bonds to one surface of the second layer, whereas the second lamination bonds to the opposite surface of the second layer. In the case of a multi-layer adhesion-promoting-sheet between the first and second layer, the surface of the adhesion-promoting-sheet associated with the first layer can either be changed or remain unchanged in the second lamination step due to adhesion. The second lamination connected to the second layer in the second lamination step is usually exposed at the back of the second layer after the second lamination step. The sandwich structure is prepared for the injection of a plastic material forming the reinforcement layer.

Pressures of between 0.5 and 2 N/mm² act in the first or second lamination step, respectively.

The sandwich structure thus produced is typically trimmed in an intermediate step, so that the outer contour substantially corresponds to the contour of the finished product. Certain regions of the first or second layer can protrude beyond the final contour of the trim element and be used for positioning or holding during the subsequent back injection molding. Prior to the back injection molding, the initially planar sandwich structure is deformed such that the contour of the sandwich corresponds to the three-dimensional contour of the trim element to be produced. Thereafter, the rear side reinforcement layer is formed by fused arrangement of a plastic material against a rear side of the second layer and bonded to the second lamination, namely by way of injection molding.

The method is preferably carried out in such a way that the heat introduced in a second lamination step takes the first lamination to a temperature not less than the maximum temperature in the first lamination during the first lamination step. This further development can be guided by the contemplation, that until the complete lamination of all layers, the temporally preceding lamination can initially take place incompletely in the sense that a temporally subsequent lamination step to form another lamination also improves the adhesion between the lamination bonded temporally earlier to the associated layer.

With regard to economic procedure management, the pressing time or the pressing pressure, respectively, should also be applied in the same manner. For the temporally subsequent lamination step, the pressing time should be longer than the pressing time applied in the temporally preceding lamination step. The pressing time is the time in which the lamination is abutted under pressure against the associated layer. The first pressing time is accordingly that time during which the first layer is abutted under pressure against the first lamination. During this time, the process heat typically also acts at the phase boundary between the first lamination and the first layer. The pressing pressure used during the first lamination step does not necessarily have to be less than the pressing pressure of the second lamination step. However, the pressing pressure should not drop in relation to the pressure applied in a temporally preceding lamination step.

The present invention can also be employed for multi-ply laminations, the individual plies of which are bonded to each other in a temporally subsequent manner and to different layers. The ply of the lamination associated with a first layer can be regarded as being the first lamination within the meaning of the present invention, whereas the second ply abutted flat against this first lamination can be regarded as being a second lamination within the meaning of the present invention. This second lamination is typically directly bonded to the second ply in the second lamination step. The process energy used there also improves the adhesion between the first ply, i.e. the first lamination, and the first layer.

The advantages of the invention discussed below with regard to laminations on different surfaces of a single layer also apply to the specifics described above. Nevertheless, it is preferable in practice to prepare multi-ply laminations first separately to form the respective layers and to combine them with one of the layers as a multi-ply lamination. In this case, the second layer is abutted against the first layer prior to the second lamination step with the interposition of the first lamination. On the side of the second layer opposite to the first layer, the second lamination is bonded to the second layer in the second lamination step. The process energy acting there also acts upon the phase boundaries between the first layer, the first lamination, and the phase boundary between the first lamination and the surface of the second layer. Not only the second lamination is thus bonded in the second lamination step to the second layer. The adhesion between the first layer and the second layer is further also improved through the medium of the first lamination.

With regard to the gentlest processing, in particular of veneers as the layer of the trim element, it is preferable in the context of manufacturing the trim element to adjust the maximum temperature in each lamination to be higher than the maximum temperature of the lamination preceding on the face side. This further development can be guided by the contemplation that the layer at the front on the face side is formed by a veneer and that the lamination that is in the context of manufacturing the trim element bonded on the rear side to the decorative layer is taken to a lower temperature than the laminations that are more remote from the face side. The veneer can then be bonded more gently to the laminate in the back of the veneer than the layer provided under adhesive bonding of this lamination to the lamination associated therewith which is regularly disposed opposite to the veneer. In this case, the veneer represents the first layer, whereas the layer bonded thereto under the medium of the first lamination constitutes the second layer within the meaning of the present invention.

The present invention can be guided by the idea that the maximum temperatures in the respective lamination are to be controlled. Due to thermally conductive processes, this maximum temperature can actually only be measured after the completion of a lamination step. The temporal performance of the lamination step and the measurement of the maximum temperature can therefore differ in time.

In view of the most resource-efficient production as possible, the contact pressure at least does not decrease between successive lamination steps. It can remain constant. The method is instead preferably carried out in such a way that the pressing pressure applied in a subsequent lamination step is higher than that in the immediately preceding lamination step. The pressing times are also adjusted in a corresponding manner. It is only after the last lamination step that an adhesion is obtained that fulfills the practical requirements between the individual laminations and the layers associated with them. The first lamination step serves only to adhere the first lamination to the associated layer. The process energy expended in the subsequent lamination steps improves this adhesion there.

According to a preferred further development of the present invention, the first and/or the second layer form the decorative surface of the trim element on the face side. This decorative surface on the face side can be provided with a transparent coating. Accordingly, the surface of the first and/or the second layer does not necessarily also have to form the outer surface of the trim element. However, the aesthetic appearance of the trim element is predominantly determined by the surface of the first and/or the second layer.

According to a preferred further development of the present invention, the rear side reinforcement layer is formed by fused arrangement of plastic material against a rear side of the first and/or the second layer. If the first layer determines at least predominantly the face side decorative surface of the trim element, the fused plastic material is abutted on the rear side against the second layer. This can be done by injection molding or foaming, commonly in an enclosed cavity. The pressure acting there and the temperature improve the adhesion of the plastic material to the second layer which on the rear side is provided with the second lamination, where the second lamination causes the adhesive bonding between the plastic material and the second layer. Alternatively, the reinforcement layer can also be formed by pressing and/or casting processes, for example, non-pressure casting processes.

According to a preferred further development of the present invention, the first layer is provided with at least one through-hole after the application of the first lamination. This through-hole passes through the first layer and the lamination. A cavity pressure acting during the formation of the reinforcement layer on the rear side of the second layers presses a region of the second layer, which is located on the rear side of the first layer, into the at least one through-hole. A trim element can thus be obtained in which surface portions of the first and the second layer are arranged side by side on the face side and substantially at the same level, as described by DE 10 2012 016 147 A1 from the present applicant.

The through-hole or the several through-holes, respectively, are there preferably recessed in the sandwich structure. For example, the first layer and the first lamination provided thereon can be penetrated by laser cutting, but the second layer is not trimmed. This can be controlled by the wavelength or power of the laser, in particular when the first layer is made of veneer and the second layer is made of metal film, for example aluminum.

Also when performing the method according to the invention, the lamination in the respective lamination step can be applied by way of flatbed, calender, rollers, wheels or a combination of these measures. In the case of a lamination from a multi-ply film, the two plies should be formed from at least two different polymers. The plies of the individual multi-ply film should be between 10 and 150 microns, preferably between 40 and 60 microns. In the case of lamination from a multi-ply film, the at least two plies should be formed from at least two different polymers.

In particular a layer with a thickness of 0.05 to 0.5, preferably 0.05 to 0.15 mm, in particular 0.1 mm is considered to be a layer within the meaning of the present invention. The latter dimensions apply in particular to a metal film forming the layer. In the case of a layer formed by wood veneer, it should have a thickness of between 0.1 and 0.5 mm, preferably 0.22 and 0.28 mm, in particular 0.25 mm. In this case, the metal film is preferably bonded by medium of the first lamination to the veneer layer, whereas the metal film itself is bonded on the rear side to a second lamination in order to be, for example, directly bonded by a thermoplastic plastic to the film by back injection molding. When manufacturing this specific embodiment, the first lamination is first bonded to the veneer layer in a first lamination step. In a second lamination step, the metal film is bonded on the rear side to a second lamination. In this case, the metal film is already abutted in the context of the second lamination step with interposition of the first lamination against the rear side of the first layer, so that the process energy applied in the second lamination step also reaches into the first lamination and the sandwich structure is obtained.

According to a preferred development of the present invention, a two-ply first lamination is used in the first lamination step. The first layer is bonded to a first lamination ply of the first lamination that is abutted against the first layer. In a second lamination step, the second layer on its side facing the first layer is bonded to a second lamination ply of the first lamination abutted against the second layer and on its side facing away from the first layer to the second lamination. The two plies of the first lamination are there adapted to the respective lamination steps. In the first lamination step, the first lamination ply abutted against the first layer is preferably fused or activated, respectively. The fusing is done in particular with thermoplastic lamination material. Activation is done with cross-linking lamination material. In the material of the first lamination step, however, the second lamination ply of the first lamination to be abutted against the second layer is not fused or activated, respectively. This is only done in the second lamination step. To improve the adhesion of the different layers to each other, it is preferable to form the first lamination ply abutted against the first layer from thermoplastic material and to form the second lamination ply to be abutted against the second layer from crosslinking material. This second lamination ply material is preferably identical to that material which is laminated against the second layer on the side of the second layer facing away from the first layer. Here as well, the lamination can be double-layered in order, firstly, to bond to the second layer as well as possible in the second lamination step and, secondly, to obtain the best possible bonding of the plastic material forming the reinforcement layer. This can also be achieved, for example, in that the second lamination layer is formed by nonwoven fabric soaked in the direction toward the second layer, but which is still fibrous on the opposite side and not soaked by the lamination material, so that it can be penetrated at least in part by the fused plastic material which then bonds basically in an integrally formed manner.

In principle, each lamination ply can each be formed from thermoplastic material or from crosslinking material. A single lamination ply can also be formed from different lamination materials imparting the adhesion, in particular, firstly, thermoplastic material and, secondly, crosslinking material. Bonding on oppositely disposed sides of a decorative layer of the trim element are preferably the same materials of the lamination ply imparting the adhesion. The decorative layer is a face side layer according to the embodiments, i.e. a layer of the trim element that defines and determines the structural configuration and to which the lamination ply adheres.

BRIEF DESCRIPTION OF THE DRAWINGS

Further details and advantages of the present invention shall become apparent from the following description of embodiments in combination with the drawing, in which.

DETAILED DESCRIPTION OF THE INVENTION

Figure 1:
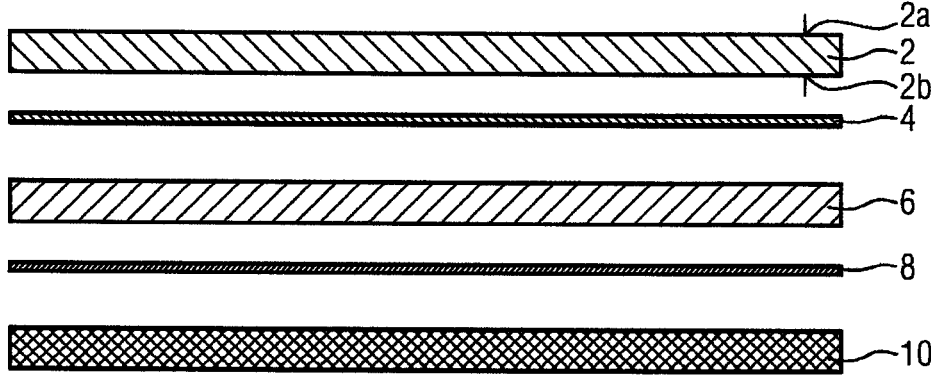
FIG. 1 shows a schematic sectional view of a structure of a first embodiment of a trim element in an exploded representation.

FIG. 1 shows different plies of a schematically illustrated embodiment of a trim element, where a layer marked with reference numeral 2 forms a face side surface 2a which can be provided with a transparent ply as a coating, not shown. Disposed opposite to the face side surface 2a is a first lamination 4 which is bonded in a first lamination step to a rear side surface 2b of the first layer. Located in a top view onto the first layer behind the first lamination 4 is a second layer 6. Disposed in the visual direction therebehind is a second lamination 8. Reference numeral 10 indicates a rear side reinforcement layer.

In the finished trim element, all plies illustrated in FIG. 1 are bonded to each other. In the manufacturing process, the first lamination 4 is first bonded in a first lamination step to the first layer 2. Thereafter, the second layer 6 is abutted together with the second lamination 8 on the rear side against the first lamination 4. The second lamination 8 is bonded in the second lamination step to the second layer 6.

The first lamination 4 is bonded to the first layer 2 subject to the application of pressure and heat over a predetermined time, hereafter referred to as the pressing time. The pressing pressure applied there is $P1$; the temperature acting there is $T1$; the pressing time is $t1$.

In the first lamination step, this process energy introduced over the pressing time $t1$ can be introduced, for example, by flatbed lamination. Once the first layer 2, which can be, for example, a veneer, has been stabilized by the first lamination 4, the combination of the first layer 2 and the first lamination 4 is treated. The veneer first layer 2 can then be ground, cut and/or provided with through-holes 12 (see FIG. 3b). The first lamination 4 acts not only as a bonding agent, but also as a reinforcement layer which supports the relatively thin veneer first layer 2 and protects it against damage during the subsequent treatment.

After treating the first layer 2 together with the first lamination 4, the second layer 6 is abutted against the rear side of the first lamination 4 and at the same time the second lamination 8 is abutted against the rear side of the second layer 6. This second lamination 8 serves as a bonding agent for the later injection of the rear side reinforcement layer 10 which is presently formed from a thermoplastic material and is formed by way of back injection molding of the intermediate product formed from the layers 2, 6 and the laminates 4, 8.

In the context of the second lamination step, this lamination 8 is bonded to the second layer 6 by a heated plate which is abutted against the rear side of the second lamination 8. The heat introduced therewith into the intermediate product passes through the second lamination 8 and the second layer 6 applying heat and pressure in the direction towards the first lamination 4 and the first layer 2. The heat causes a heating effect there as well. In the event that the lamination 4 or 8, respectively, is made of nonwoven fabric that is applied adhesive on both sides, the adhesive of both the first lamination 4 as well as the second lamination 8 is crosslinked by this heat. Partial crosslinking of the first lamination 4 effected in the first lamination step for bonding to the first layer 2 is completed accordingly. The crosslinking also causes adhesion to the first lamination 4 and the second layer 6. The method can there be carried out in such a way that heat introduced into the first layer 2 and the first lamination 4 in the context of the first lamination step is still present as a temperature increase in these two plies 2, 4, so that the process energy introduced in the first lamination step has not been completely lost when further process energy is introduced into the ply structure in the second lamination step.

The temperature of the second lamination 8 is $T2$; the pressure for the second lamination step is $P2$; the pressing time for the second lamination step is $t2$. It is true that $T2 \geq T1$; $t2 \geq t1$; $P2 \geq P1$.

$T1$ there refers to the temperature of the first lamination 4 in the first lamination step and $T2$ to the temperature of the second lamination 8 in the second lamination step. This second lamination step leads to a temperature increase in the region of the first lamination 4. The temperature of the first lamination 4 during the second lamination step is $T1.2$. A temperature increase of the first lamination 4 arises in the context of the second lamination step. This increases the temperature of the first lamination 4 in the context of the second lamination step. The maximum temperature $T1.2$ is typically above the maximum temperature $T1$, i.e. the temperature of the first lamination 4 in the first lamination step. However, the method should be carried out in such a way that the temperature $T1.2$ is at all times lower than the temperature $T2$, also in the second lamination step. This can be achieved in that the surface supporting the first layer on the outer side during laminating has a lower temperature than the surface acting against the second lamination 8. The respective ply structure is typically heated to a respective uniform temperature in the individual steps. The first temperature is usually selected in such a way that the first lamination is at least pinned to the first layer. In the subsequent second step, the first lamination is finally cross-linked or almost finally crosslinked, if this second step is the last lamination step.

Figure 2:
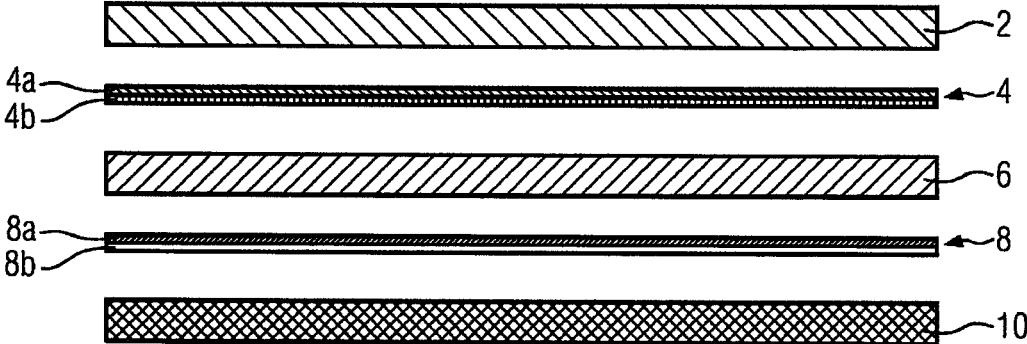
FIG. 2 shows a schematic sectional view of a structure of a second embodiment of a trim element in an exploded representation.

FIG. 2 shows a similar structure of a trim element. Same components are designated with the same reference numerals. The respective laminations are formed by a two-ply structure. The first lamination 4 has a face side ply 4a and a rear side ply 4b. The face side ply 4a is configured or adapted to the first layer 2 in terms of a good adhesion properties. The rear side ply 4b exhibits adhesion properties adapted to the second layer 6. The multi-ply first lamination 4 is a two-layer plastic film formed from two polymer plies.

The second lamination 8 is also structured in a corresponding manner. The face side ply 8a exhibits adhesion properties adapted to the second layer 6. The rear side ply 8b exhibits adhesion properties for the best possible adhesion to the reinforcement layer 10.

A combination of the first and the second lamination of a single-layer (cf. FIG. 1) and a multi-layer (cf. FIG. 2) lamination are also possible and conceivable.

Figure 3A:
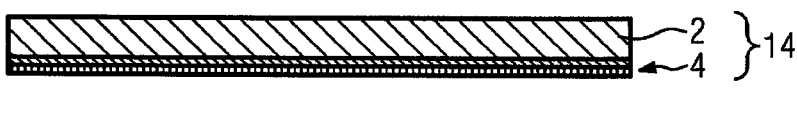
FIGS. 3a to 3d show schematic sectional views for process steps for manufacturing a third embodiment of a trim element according to the present invention.

FIG. 3a shows in a cross-sectional view a first layer 2 which is formed in the present case as a decorative layer in the form of a veneer having a thickness of between 0.1, preferably 0.5 and 0.9 mm.

The first layer 2 is bonded to a first lamination 4 which has been laminated to the rear side of the first layer 2 with the application of heat and pressure to the extent that the lamination is at least pinned to the decorative layer and thus positioned.

The previously discussed through-holes 12 are punched out of the ply composite from the decorative layer 2 and the lamination 4.

The first decorative layer 2 can by itself or together with the first lamination 4 be shaped by cutting and be ground and calibrated to said thickness, possibly be shaped to size or provided with support holes, respectively, in order to position and hold the first decorative layer 2 on pins of an injection molding tool. By applying pressure and temperature, the first decorative layer 2 can be transformed into a three-dimensional preform, for example, to produce a slight contouring on the face side and/or a curved optionally circumferential edge in the outer zones of the decorative layer 2. Also this treatment can be carried out with the lamination 4 provided on the rear side of the layer 2. The heat acting in this process can either bond the lamination 4 to the rear side of the layer 2 for the first time or improve an already created provisional bonding between the lamination 4 and the layer 2 by increasing the degree of crosslinking within the lamination 4.

The first decorative layer 2 can also be treated by spraying a stain or be ball-peened/surface-treated.

The decorative layer 2 presently has several separate island-shaped decorative elements, of which only one is shown and marked with reference numeral 2a, and which are each provided independently and without bonding to each other, but each provided with the lamination 4 The through-holes 12 penetrate both the layer 2 as well as the lamination 4.

The second layer 6, which can be, for example, a plastic or metal film, which in turn is provided with the second lamination 8, is abutted against this ply composite 14 shown in FIG. 3a.

The heat acting in this second lamination step and the pressure acting there causes the second lamination 8 to be laminated against the rear side of the second layer 6, but also leads to further or complete cross-linking of the first lamination 4 and therefore to the first lamination 4 curing, firstly, against the rear side of the first layer 2 and, secondly, against the face side surface of the second layer 6.

Figure 3B:
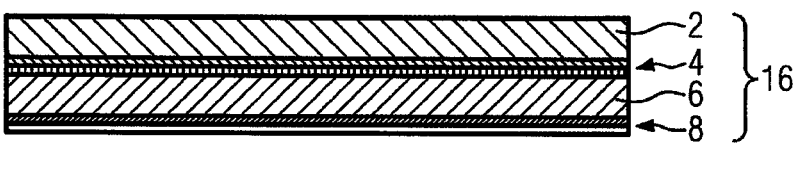

The sandwich structure identified by reference number 16 in FIG. 3b is obtained after lamination. The through-holes 12 are preferably formed there by laser cutting prior to or after the deformation of the sandwich structure to create a three-dimensional molded part.

Figure 3C:
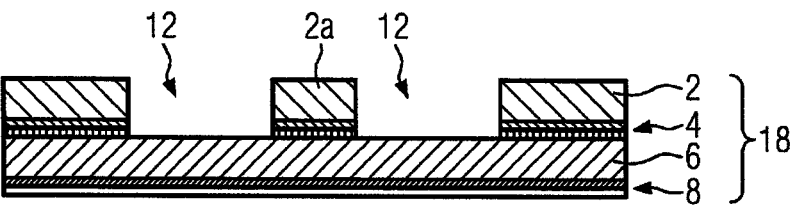

Prepared in this manner, the further intermediate product 18 shown in FIG. 3c is inserted into a tool half of an injection mold tool and positioned there. A face side surface of the first layer 2 there abuts against a surface of the injection mold tool defining the cavity, the face side surface of the second layer 6 is disposed with a spacing and parallel to this surface defining the cavity, whereas a rear side, which is formed exclusively by the second lamination 8, is exposed in this mold cavity and defines it.

A plastic component is now injected into the mold cavity and forms the reinforcement layer 10 on the rear side of the second lamination 8. By back injection molding the reinforcement layer 10, the latter is bonded to the rear side of the second lamination 8.

Figure 3D:
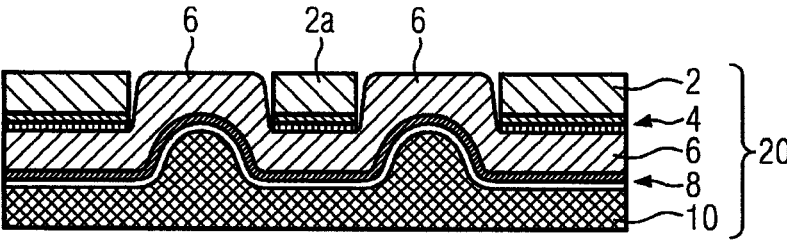

The intermediate product 18 shown in FIG. 3c is deformed due to the injection pressure acting and the afterpressure when the plastic component solidifies. The second layer 6 is there pressed into the through-holes 12, so that the face side surface of the second layer 6 is arranged flush to the face side surface of the first layer 2. In this manner, the plastic material of the reinforcement layer 10 solidifies, so that the trim element 20 shown in FIG. 3d as the product is obtained in a dimensionally stable manner.

A transparent or transparently colored coating can now be provided on the face side of this trim element 20 for protecting the product from environmental influences or scratches on the face side. This can be done, for example, in a turning tool which relocates the product shown in FIG. 3d in order to apply a coating on the face side produced by spray coating, presently with a transparent thermoplastic material such as PMMA.

The energy introduced in each injection molding cycle in the form of pressure and heat can be taken into account when optimizing the process parameters in view of a process that is as resource-efficient as possible. The method can be carried out in such a manner that all laminations have the degree of cross-linking required for the final product only after the last or the only injection mold coating. In this manner, the preceding lamination steps can be carried out while saving energy, but nevertheless produce a finished product which meets the demanded requirements.

In the embodiment shown, the first lamination 4 is laminated at a temperature of between 100° C. and 140° C. with an exposure time of approximately 30 to 40 seconds. In the second lamination step, the bonding between the second layer 6 and the first layer 2 takes place at temperatures of between 160° C. and 190° C. with an exposure time of approximately 100 to 140 seconds. Under these conditions, the second lamination 8 is also abutted on the rear side against the second layer 6.

LIST OF REFERENCE NUMERALS 2 first layer
2a island-shaped trim element
2b rear side surface
4 first lamination
4a face side ply of the first lamination 4*b* rear side ply of the first lamination
6 second layer
8 second lamination
8*a* face side ply of the second lamination
8*b* rear side ply of the second lamination
10 reinforcement layer
12 through-holes
14 ply composite
16 sandwich structure
18 intermediate product
20 trim element

What is claimed is:

1. A method for manufacturing a trim element with a rear side reinforcement layer and a face side decorative surface;
    in which a first layer is bonded under pressure and heat in a first lamination step to a first lamination for producing a substantially planar ply composite,
    in which a second layer is bonded under pressure and heat in a subsequent second lamination step to a second lamination,
    wherein in said subsequent second lamination step, the second layer is abutted against the first lamination and heat introduced in said second lamination step also acts on the first lamination, so that the second layer is bonded to the ply composite via the first lamination to produce a substantially planar sandwich structure,
    wherein the rear side reinforcement layer is formed by a fused arrangement of a plastic material against a rear side of the second layer and bonded to the second lamination,
    wherein the first lamination comprises a two-ply lamination having a first lamination face side ply and a first lamination rear side ply and the first layer is bonded to the first lamination face side ply abutted against the first layer;
    wherein the second lamination comprises a two-ply lamination having a second lamination face side ply and a second lamination rear side ply and the second layer is bonded to the second lamination face side ply abutted against the second layer, and in said subsequent second lamination step the second layer on the second layer's side facing the first layer is bonded to the first lamination rear side ply abutted against the second layer and on the second layer's side facing away from the first layer is bonded to the second lamination, and
    wherein the first lamination rear side ply and the second lamination face side ply are made of a first material that is the same and the first lamination face side ply and the second lamination rear side ply are made of a second material that is different than the first material.

2. The method for manufacturing a trim element according to claim 1, wherein:
    the first lamination face side ply that in the first lamination step is abutted against the first layer is fused or activated and wherein the first lamination rear side ply is not fused or activated.

3. The method for manufacturing a trim element according to claim 1, wherein:
    the second layer is abutted against the first lamination rear side ply prior to said subsequent second lamination step and that in manufacturing the trim element, a maximum temperature in the first lamination is not higher than a maximum temperature in the second lamination during the subsequent second lamination step.

4. The method for manufacturing a trim element according to claim 1, wherein:

in manufacturing the trim element, a maximum temperature in each lamination is not less than a maximum temperature in a lamination preceding on the face side decorative surface and a pressing pressure of a temporally subsequent lamination step is not less than a pressing pressure of a temporally immediately subsequent lamination step subsequent to the temporally subsequent lamination step.

5. The method for manufacturing a trim element according to claim 1, wherein:
    the second layer is abutted against the first lamination rear side ply prior to said subsequent second lamination step and in manufacturing the trim element, a maximum temperature in each lamination is not less than a maximum temperature in a lamination preceding on the face side decorative surface and the pressing pressure of a temporally subsequent lamination step is not less than the pressing pressure of a temporally immediately subsequent lamination step subsequent to the temporally subsequent lamination step.

6. The method for manufacturing a trim element according to claim 1, wherein:
    the first material comprises an activation cross-linking lamination material; and
    the second material comprises a fusing thermoplastic lamination material.

7. A method for manufacturing a trim element having a face side decorative surface and a rear side reinforcement layer comprising the steps of:
    bonding a first layer under pressure and heat with a first lamination to a rear side surface of the first layer opposite the face side decorative surface, the first lamination comprises a first lamination face side ply comprising a fusing thermoplastic and a first lamination rear side ply comprising an activation cross-linking material, wherein the first lamination face side ply is bonded adjacent the rear side surface of the first layer and the first lamination rear side ply faces away from the first layer forming a first ply composite;
    treating the first ply composite with a subsequent treatment, whereby the first lamination reinforces and protects the first layer during the subsequent treatment;
    placing a second layer having a second layer face side surface and a second layer rear side surface with the second layer face side surface adjacent the first lamination rear side ply of the first layer, the second layer provided with a second lamination comprising an activation cross-linking material adjacent the second layer rear side surface; and
    bonding the second layer face side surface of the second layer under pressure and heat to the first lamination rear side ply forming a sandwich structure.

8. A method for manufacturing a trim element according to claim 7, wherein:
    the second lamination comprises a second lamination face side ply and a second lamination rear side ply wherein the second lamination face side ply is bonded adjacent the rear side surface of the second layer and the second lamination rear side ply faces away from the second layer.

9. A method for manufacturing a trim element according to claim 7, wherein:
    the pressure and heat in said step of bonding the second layer is greater than the pressure and heat in said step of bonding the first layer.

10. A method for manufacturing a trim element according to claim 7, wherein:

a maximum temperature of the first lamination during said step of bonding the second layer face side surface of the second layer to the first lamination rear side ply is lower than a temperature of the second lamination during said step of bonding the second layer face side surface of the second layer to the first lamination rear side ply.

11. A method for manufacturing a trim element according to claim 7, wherein:

the subsequent treatment comprises grinding, cutting, or providing through holes.

12. A method for manufacturing a trim element having a face side decorative surface and a rear side reinforcement layer comprising the steps of:

bonding a first layer under pressure and heat with a first lamination to a rear side surface of the first layer opposite the face side decorative surface, the first lamination comprises a first lamination face side ply made of a fusing thermoplastic material and a first lamination rear side ply made of an activation crosslinking material wherein the first lamination face side ply is bonded adjacent the rear side surface of the first layer and the first lamination rear side ply faces away from the first layer forming a first ply composite;

placing a second layer having a second layer face side surface and a second layer rear side surface with the second layer face side surface adjacent the first lamination rear side ply of the first layer, the second layer provided with a second lamination comprising an activation cross-linking material adjacent the second layer rear side surface;

bonding the second layer face side surface of the second layer under pressure and heat to the first lamination rear side ply forming a sandwich structure;

forming the sandwich structure into a desired contour of the trim element; and fusing a reinforcement layer to the second lamination.

\* \* \* \* \*